(No Model.)
M. ROSENOW.
MACHINE FOR CUTTING WOODEN HOOP LOCKS.
No. 453,916. Patented June 9, 1891.
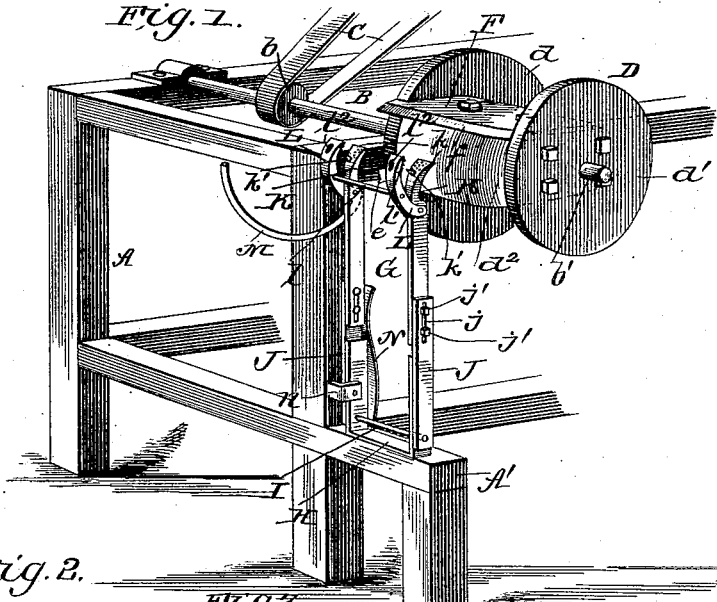
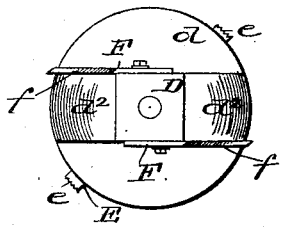 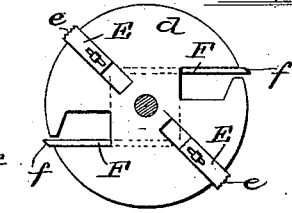 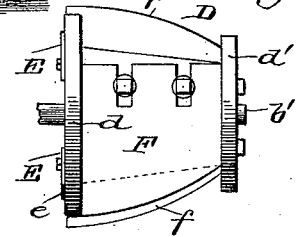
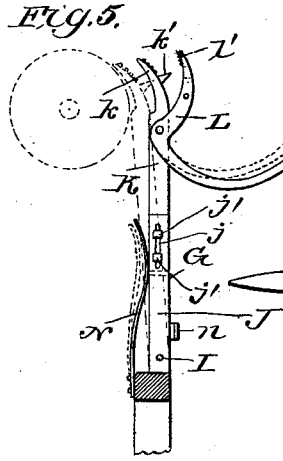 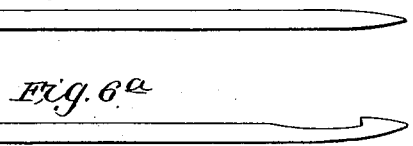
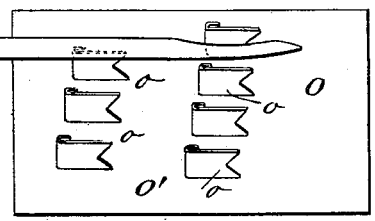
WITNESSES:
Fred G. Dieterich
Jos. A. Ryan
INVENTOR:
Max Rosenow.
BY Munn & Co
ATTORNEYS

UNITED STATES PATENT OFFICE.

MAX ROSENOW, OF PEORIA, ILLINOIS.

MACHINE FOR CUTTING WOODEN-HOOP LOCKS.

SPECIFICATION forming part of Letters Patent No. 453,916, dated June 9, 1891.

Application filed October 29, 1890. Serial No. 369,749. (No model.)

*To all whom it may concern:*

Be it known that I, MAX ROSENOW, residing at Peoria, in the county of Peoria and State of Illinois, have invented certain new and useful Improvements in Machines for Cutting Wooden-Hoop Locks, of which the following is a specification.

My invention has for its object to provide a simple and effective machine for cutting the locks in wooden hoops in a quick and positive manner, which can be constructed at a small cost and which is easily operated.

To this end my invention consists in the novel features of construction and peculiar combination of parts, all of which will hereinafter be fully described in the annexed specification, and particularly pointed out in the claims, reference being had to the accompanying drawings, in which—

Figure 1 is a perspective view of a machine embodying my invention. Fig. 2 is a face view of the small end of the cutter-head. Fig. 3 is a similar view of the large end of the same. Fig. 4 is a side view thereof. Fig. 5 is a side view of the adjustable clamps. Figs. 6 and 6$^a$ show the hoop before and after being cut. Fig. 7 is a detail view hereinafter specially referred to.

In the accompanying drawings, A indicates a suitably-arranged frame, upon which is mounted a transverse shaft or mandrel B, which is supplied with a band-pulley $b$, which receives its motion from the belt C, driven in any well-known manner.

Upon the outer projecting end $b'$ of the shaft B is fixedly held the cutter-head D, which consists of a large inner disk $d'$, a smaller outer disk $d'$, and the intermediate cutter-block $d^2$, the outer edges of which are curved on its outer face transversely and longitudinally, as clearly shown in Figs. 2 and 4.

Upon the rear face of the disk $d$ are adjustably secured the radially and oppositely projecting cutters E, the outer ends of which are formed with saw-like teeth $e$, said ends projecting beyond the edge of the block $d^2$ a distance desired for the straight cut of the hoop-lock, said cutters E serving to make such cuts in the hoop when it is pushed up against the cutter-head in the manner presently described.

Upon the opposite flat faces of the block $d^3$ and projecting in opposite directions are adjustably secured the curved cutters F, the outer cutting-edges $f$ of which are projected slightly beyond the peripheral edge of the block $d^2$, and are curved, as shown, said cutters serving to cut the curved portion of the hoop-lock.

G indicates a hoop-clamping device which is mounted upon an extension A' of the frame A in front of the cutter-head, as most clearly shown in Fig. 1 of the drawings, by reference to which it will be seen that said clamping device consists of the ⌊_⌋-shaped base-frame H, in the members $h\ h$ of which is journaled a transverse rod I, upon the outer ends of which are fixedly secured the plates J J, the upper ends of which are provided with vertical slots $jj$, and upon such ends are secured for vertical adjustment, by means of the bolts and nuts $j'j'$, the clamping-jaws K K, as shown. By this arrangement the jaws can be set to hold hoops of different widths to the cutters. The upper ends of jaws K K are curved inward toward the cutters, as at $k$, and are serrated and formed with projecting prongs $k'$, for a purpose presently explained. Supplemental jaws L L are pivoted to the jaws K near the outer upper ends, said jaws being connected by the transverse rod $l$, as shown. The inner faces of the jaws L are serrated at $l'$, said jaws being also provided with slots $l^2$, through which the ends of the prongs $k'$ pass when the jaws L are closed onto the jaws K.

Fixedly connected to the rod $l$ or to one of the jaws L is a hand-lever M, by means of which the upper jaws L can be closed onto the jaws K in a manner clearly shown in Fig. 5 of the drawings.

N indicates a flat spring secured to the frame portion A', which serves to normally hold the clamping device away from the cutter-head, the rearward movement of such device being limited by the stop $n$.

The manner in which my machine is operated is as follows: One end of the hoop, which is of the shape shown in Fig. 6, is placed between the jaws K L, the lower edge resting upon and guided by the prongs $k'$. The operator grasping the handle M and closing the jaws on said end holds it steady. He then presses against the upper end of the clamping device, which causes the entire jaw-frame to swing forward on the transverse rod I against the tension of the spring N, thus forcing the end of the device against the knives, as clearly shown in dotted lines in Fig. 5. After the said end is cut the operator turns the hoop and brings the opposite end between the jaws and operates as before. This second operation completes the lock for the hoop, thus leaving both ends cut and making the finished hoop-bar shown in Fig. 6$^a$.

In preparing the hoops for barrels it is necessary that the lock cuts be made at different points from the ends, so as to enable the hoops to encircle the different horizontal widths of the barrel. For this purpose a set of gages O are provided, arranged as shown most clearly in Fig. 7 of the drawings, by reference to which it will be seen that seven different gages $o$ are provided, arranged three in an inner and four in an outer row, the inner row being arranged to set the lengths of the end hoops and the outer row for the central hoops.

In operation the hoops after having one end cut into a lock are held by their lock cut to the forked edges of the gages O, which sets their uncut ends to the proper position for cutting by the cutters. Such hoops as are held by the outer row of gages will be of proper lengths for use as center hoops and such as have been held by the inner row will be of proper lengths for the end hoops.

Having thus described my invention, what I claim as new is—

1. In a hoop-lock-cutting machine, the combination, with a revolving cutter-head, of a hoop-clamping device arranged at right angles to the rotation of the cutter-head, said device pivotally supported and vertically adjustable in relation to said cutters, substantially as and for the purpose described.

2. A wooden-hoop-lock-cutting machine consisting of a revolving cutter-head consisting of an inner disk $d$, an outer disk $d'$, an intermediate block $d^2$, curved transversely and longitudinally, as shown, horizontal cutters F, adjustably secured upon the opposite faces of the block $d^2$, said cutters having curved cutting-edges $f$ projected over the edges of the block $d^2$, the radially-projecting cutters E, secured to the disk $d$, and a hoop-clamping device arranged to hold the hoop against the cutters, substantially as and for the purpose described.

3. The combination, with a revolving cutter-head provided with horizontally-arranged cutters adapted to cut the curve of the lock and vertical cutters arranged to cut the straight portion of the lock, of the clamping device G, formed of vertically-adjustable arms pivotally connected to the frame of the machine at right angles to the rotation of the cutters, said arms formed with curved jaws K at the upper ends, the supplemental jaws L, pivoted to the jaws K, adapted to be closed down thereon, and means for operating the said jaws and moving the device to the cutters, substantially as and for the purpose described.

4. The combination, with a revolving cutter-head constructed substantially as shown, of the clamping device G, arranged at right angles to the revolution of said cutter-head, said device consisting of the frame H, formed with a stop $n$, the bars J, pivoted at the lower ends to the frame H, the arms formed with the jaws K, connected at their lower ends to the bars J, the spring N, secured to the frame and bearing against one of said bars J to normally force the device backward, said jaws formed with prongs $k'$, the supplemental jaws L, formed with openings $l^2$, secured to the jaws K and connected with each other, and the lever M, connected to said jaws L, all arranged substantially as and for the purpose described.

MAX ROSENOW.

Witnesses:
MAX. H. RITZWOLLER,
G. H. WYMOND.